(12) United States Patent
Yu et al.

(10) Patent No.: US 11,518,204 B2
(45) Date of Patent: Dec. 6, 2022

(54) TRAILER DETECTION AND AUTONOMOUS HITCHING

(71) Applicant: Continental Automotive Systems, Inc., Auburn Hills, MI (US)

(72) Inventors: Xin Yu, Troy, MI (US); Matthew Donald Berkemeier, Beverly Hills, MI (US); Julien Ip, Madison Heights, MI (US); Eduardo Jose Ramirez Llanos, Auburn Hills, MI (US); Kyle P Carpenter, Rochester, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 442 days.

(21) Appl. No.: 16/392,977

(22) Filed: Apr. 24, 2019

(65) Prior Publication Data
US 2019/0339704 A1    Nov. 7, 2019

Related U.S. Application Data

(60) Provisional application No. 62/665,247, filed on May 1, 2018.

(51) Int. Cl.
*B60D 1/36* (2006.01)
*G06T 7/70* (2017.01)
(Continued)

(52) U.S. Cl.
CPC ............... *B60D 1/36* (2013.01); *B62D 13/06* (2013.01); *B62D 15/026* (2013.01);
(Continued)

(58) Field of Classification Search
CPC ...... B60D 1/36; B62D 15/026; G05D 1/0225; G05D 1/0246; G06T 7/74; G06T 11/20;
(Continued)

(56) References Cited

U.S. PATENT DOCUMENTS

| 2002/0154005 A1 | 10/2002 | Wall et al. |
| 2005/0074143 A1 | 4/2005 | Kawai |

(Continued)

FOREIGN PATENT DOCUMENTS

| CN | 106225723 A | 12/2016 |
| DE | 102012018914 A1 | 3/2014 |

(Continued)

OTHER PUBLICATIONS

The International Search Report and the Written Opinion of the International Searching Authority dated Jul. 24, 2019 for the counterpart PCT Application No. PCT/US2019/029233.

(Continued)

*Primary Examiner* — Peter D Nolan
*Assistant Examiner* — Tarek Elarabi

(57) ABSTRACT

A method for autonomously maneuvering a tow vehicle towards a trailer positioned behind the tow vehicle is provided. The method includes receiving one or more images from one or more cameras positioned on a back portion of the tow vehicle. The method also includes identifying a trailer representation within the one or more images. The trailer representation being indicative of the trailer positioned behind the tow vehicle. The method also includes setting a vertical center of the trailer representation as a target. The method also includes determining a first steering wheel angle to turn the tow vehicle such that the vehicle autonomously maneuvers in a direction towards the target. The method also includes transmitting instructions to a drive system causing the tow vehicle to maneuver based on the first steering wheel angle.

20 Claims, 15 Drawing Sheets

(51) Int. Cl.
  *B62D 13/06* (2006.01)
  *G06T 7/73* (2017.01)
  *B62D 15/02* (2006.01)
  *G05D 1/02* (2020.01)
  *G06T 11/20* (2006.01)
  *H04N 5/225* (2006.01)
  *G05D 1/00* (2006.01)

(52) U.S. Cl.
  CPC ......... *G05D 1/0225* (2013.01); *G05D 1/0246* (2013.01); *G06T 7/70* (2017.01); *G06T 7/74* (2017.01); *G06T 11/20* (2013.01); *H04N 5/2253* (2013.01); *G05D 1/0016* (2013.01); *G06T 2207/30244* (2013.01); *G06T 2207/30252* (2013.01); *G06T 2210/12* (2013.01)

(58) Field of Classification Search
  CPC ...... G06T 2207/30252; G06T 2210/12; H04N 5/2253
  See application file for complete search history.

(56) References Cited

U.S. PATENT DOCUMENTS

| | | | |
|---|---|---|---|
| 2005/0193603 A1 | 9/2005 | Schultz et al. | |
| 2007/0154068 A1* | 7/2007 | Stein | G01S 17/93 382/106 |
| 2009/0236825 A1* | 9/2009 | Okuda | B60D 1/36 348/148 |
| 2010/0096203 A1 | 4/2010 | Freese et al. | |
| 2011/0216199 A1 | 9/2011 | Trevino et al. | |
| 2014/0151979 A1 | 6/2014 | Puckett et al. | |
| 2015/0077557 A1 | 3/2015 | Han et al. | |
| 2015/0115571 A1* | 4/2015 | Zhang | H04N 7/183 280/477 |
| 2015/0321666 A1 | 11/2015 | Talty et al. | |
| 2016/0288601 A1* | 10/2016 | Gehrke | G06K 9/6201 |
| 2016/0304122 A1 | 10/2016 | Herzog et al. | |
| 2017/0032681 A1 | 2/2017 | Tomozawa et al. | |
| 2017/0151846 A1* | 6/2017 | Wuergler | B62D 15/029 |
| 2017/0174130 A1 | 6/2017 | Hu et al. | |
| 2018/0056868 A1 | 3/2018 | Naserian et al. | |
| 2018/0081370 A1* | 3/2018 | Miller | B60D 1/36 |
| 2018/0147900 A1* | 5/2018 | Shank | B60R 25/25 |
| 2019/0263344 A1* | 8/2019 | Yokoi | B60W 30/09 |
| 2020/0242924 A1* | 7/2020 | Publicover | G08G 1/147 |

FOREIGN PATENT DOCUMENTS

| | | |
|---|---|---|
| DE | 102014114078 A1 | 4/2015 |
| EP | 3275704 A2 | 1/2018 |
| EP | 3299191 A1 | 3/2018 |
| JP | 2014502582 A | 2/2014 |
| JP | 2016203972 A | 12/2016 |
| JP | 2017030549 A | 2/2017 |
| WO | 2012096875 A1 | 7/2012 |
| WO | 2012103193 A1 | 8/2012 |
| WO | 2016155919 A1 | 10/2016 |

OTHER PUBLICATIONS

Japanese Office Action dated Dec. 6, 2021 for the counterpart Japanese Patent Application No. 2020-560944.

* cited by examiner

TRAILER DETECTION AND AUTONOMOUS HITCHING

CROSS REFERENCE TO RELATED APPLICATIONS

This U.S. patent application claims priority under 35 U.S.C. § 119(e) to U.S. Provisional Application 62/665, 247, filed on May 1, 2018, which is hereby incorporated by reference in its entirety.

TECHNICAL FIELD

This disclosure relates to a method and device for determining a location of a trailer positioned behind a vehicle and autonomously maneuvering towards the trailer for hitching.

BACKGROUND

Trailers are usually unpowered vehicles that are pulled by a powered tow vehicle. A trailer may be a utility trailer, a popup camper, a travel trailer, livestock trailer, flatbed trailer, enclosed car hauler, and boat trailer, among others. The tow vehicle may be a car, a crossover, a truck, a van, a sports-utility-vehicle (SUV), a recreational vehicle (RV), or any other vehicle configured to attach to the trailer and pull the trailer. The trailer may be attached to a powered vehicle using a trailer hitch. A receiver hitch mounts on the tow vehicle and connects to the trailer hitch to form a connection. The trailer hitch may be a ball and socket, a fifth wheel and gooseneck, or a trailer jack. Other attachment mechanisms may also be used. In addition to the mechanical connection between the trailer and the powered vehicle, in some examples, the trailer is electrically connected to the tow vehicle. As such, the electrical connection allows the trailer to take the feed from the powered vehicle's rear light circuit, allowing the trailer to have taillights, turn signals, and brake lights that are in sync with the lights of the powered vehicle.

Recent advancements in sensor technology have led to improved safety systems for vehicles. As such, it is desirable to provide a system that is capable of determining a position of a trailer relative to a tow vehicle, which allows the tow vehicle to autonomously maneuver towards the trailer.

SUMMARY

One aspect of the disclosure provides a method for autonomously maneuvering a tow vehicle towards a trailer positioned behind the tow vehicle. The method includes receiving, at data processing hardware, one or more images from one or more cameras positioned on a back portion of the tow vehicle and in communication with the data processing hardware. The method also includes identifying, by the data processing hardware, a trailer representation within the one or more images. The trailer representation being indicative of the trailer positioned behind the tow vehicle. The method also includes setting, by the data processing hardware, a vertical center of the trailer representation as a target. The method also includes determining, by the data processing hardware, a first steering wheel angle to turn the tow vehicle such that the vehicle autonomously maneuvers in a direction towards the target. The method also includes transmitting, from the data processing hardware to a drive system in communication with the data processing hardware, instructions causing the tow vehicle to maneuver based on the first steering wheel angle.

Implementations of the disclosure may include one or more of the following optional features. In some implementations the method further includes determining, by the data processing hardware, a pixel distance between a vertical center of the trailer representation and a vertical center of the one or more images. When the pixel distance between the vertical center of the trailer representation and the vertical center of the one or more images is less than a threshold: the method includes setting, by the data processing hardware, the vertical center of the trailer representation as the target; and determining, by the data processing hardware, the first steering wheel angle to turn the tow vehicle such that the vehicle autonomously maneuvers in the direction towards the target.

In some examples, the method further includes: determining, by the data processing hardware, a pixel distance between a vertical center of the trailer representation and a vertical center of the one or more images. When the pixel distance between the vertical center of the trailer representation and the vertical center of the one or more images is greater than a threshold: the method may also include setting, by the data processing hardware, a predefined lateral offset from the vertical center of the image as the target; and determining, by the data processing hardware, a second steering wheel angle to turn the tow vehicle such that the vehicle autonomously maneuvers in a direction towards the target.

In some implementations, the threshold includes a number of pixels. The second steering wheel angle to turn the tow vehicle such that the vehicle autonomously maneuvers in the direction towards the target may be a maximum steering wheel angle that prevents the tow vehicle and the trailer from jackknifing.

In some examples, the method further includes bounding the trailer representation with a bounding box. The vertical center of the trailer representation includes a line dividing the trailer representation vertically into two equal sections. The vertical center of the one or more images may include a line dividing each image of the one or more images vertically into two equal sections, each section having equal number of pixels. In some examples, the one or more cameras include a monocular camera and/or a fisheye camera.

Another aspect of the disclosure provides a system for autonomously maneuvering a tow vehicle towards a trailer positioned behind the tow vehicle. The system includes data processing hardware and memory hardware in communication with the data processing hardware. The memory hardware stores instructions that when executed on the data processing hardware cause the data processing hardware to perform operations. The operations include receiving one or more images from one or more cameras positioned on a back portion of the tow vehicle and in communication with the data processing hardware. The operations also include identifying a trailer representation within the one or more images. The trailer representation indicative of the trailer positioned behind the tow vehicle. The operations also include setting a vertical center of the trailer representation as a target. The operations also include determining a first steering wheel angle to turn the tow vehicle such that the vehicle autonomously maneuvers in a direction towards the target. The operations also include transmitting to a drive system in communication with the data processing hardware, instructions causing the tow vehicle to maneuver based on the first steering wheel angle.

Implementations of this aspect of the disclosure may include one or more of the following optional features. In some implementations the operations further include: determining a pixel distance between a vertical center of the trailer representation and a vertical center of the one or more images. When the pixel distance between the vertical center of the trailer representation and the vertical center of the one or more images is less than a threshold: the operations include setting the vertical center of the trailer representation as the target and determining, by the data processing hardware, the first steering wheel angle to turn the tow vehicle such that the vehicle autonomously maneuvers in the direction towards the target.

In some implementations, the operations further include: determining a pixel distance between a vertical center of the trailer representation and a vertical center of the one or more images. When the pixel distance between the vertical center of the trailer representation and the vertical center of the one or more images is greater than a threshold: the operations include setting a predefined lateral offset from the vertical center of the image as the target, and determining, by the data processing hardware, a second steering wheel angle to turn the tow vehicle such that the vehicle autonomously maneuvers in a direction towards the target.

In some examples, the threshold includes a number of pixels. The second steering wheel angle to turn the tow vehicle such that the vehicle autonomously maneuvers in the direction towards the target may be a maximum steering wheel angle that prevents the tow vehicle and the trailer from jackknifing.

In some examples, the operations further include bounding the trailer representation with a bounding box, where the vertical center of the trailer representation includes a line dividing the trailer representation vertically into two equal sections. The vertical center of the one or more images may include a line dividing each image of the one or more images vertically into two equal sections, each section having equal number of pixels. The system where the one or more cameras include a monocular camera and/or a fisheye camera.

The details of one or more implementations of the disclosure are set forth in the accompanying drawings and the description below. Other aspects, features, and advantages will be apparent from the description and drawings, and from the claims.

DESCRIPTION OF THE DRAWINGS

Like reference symbols in the various drawings indicate like elements.

DETAILED DESCRIPTION

A tow vehicle, such as, but not limited to a car, a crossover, a truck, a van, a sports-utility-vehicle (SUV), and a recreational vehicle (RV) may be configured to tow a trailer. The tow vehicle connects to the trailer by way of a trailer hitch. It is desirable to have a tow vehicle that is capable of autonomously backing up towards a trailer identified from one or more trailer representations of trailers displayed on a user interface, such as a user display. In addition, it is also desirable to have a tow vehicle that is capable of estimating a trailer position, for example, a trailer angle and position relative to a tow vehicle, based on one or more images received from a camera positioned on a rear portion of the tow vehicle. In addition, it is desirable to have tow vehicle that is capable of autonomously maneuvering towards the trailer and to align with a trailer hitch coupler of the trailer for hitching between a vehicle hitch ball of the tow vehicle and the trailer hitch coupler.

Figure 1:
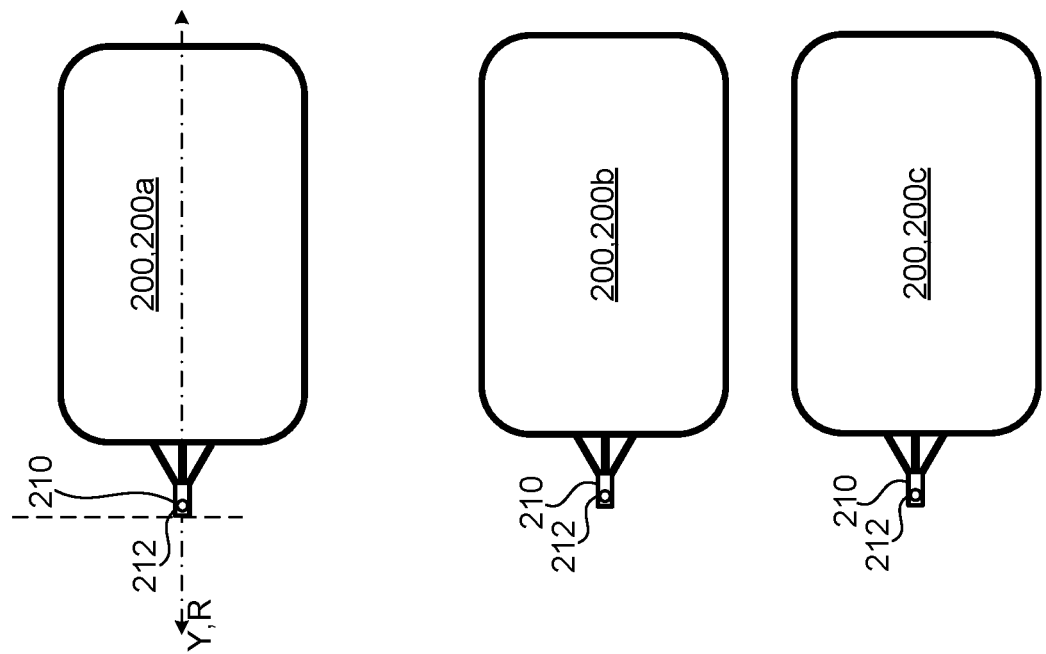
FIG. 1 is a schematic top view of an exemplary tow vehicle at a distance from trailers positioned behind the tow vehicle.
Figure 1:
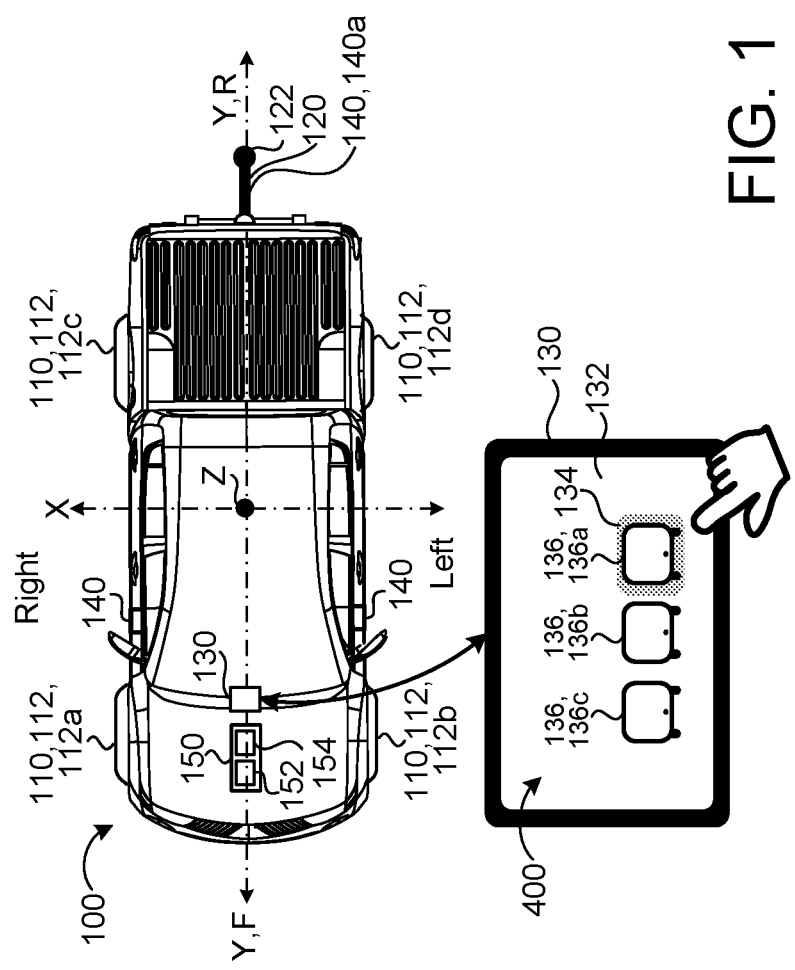
Figure 2:
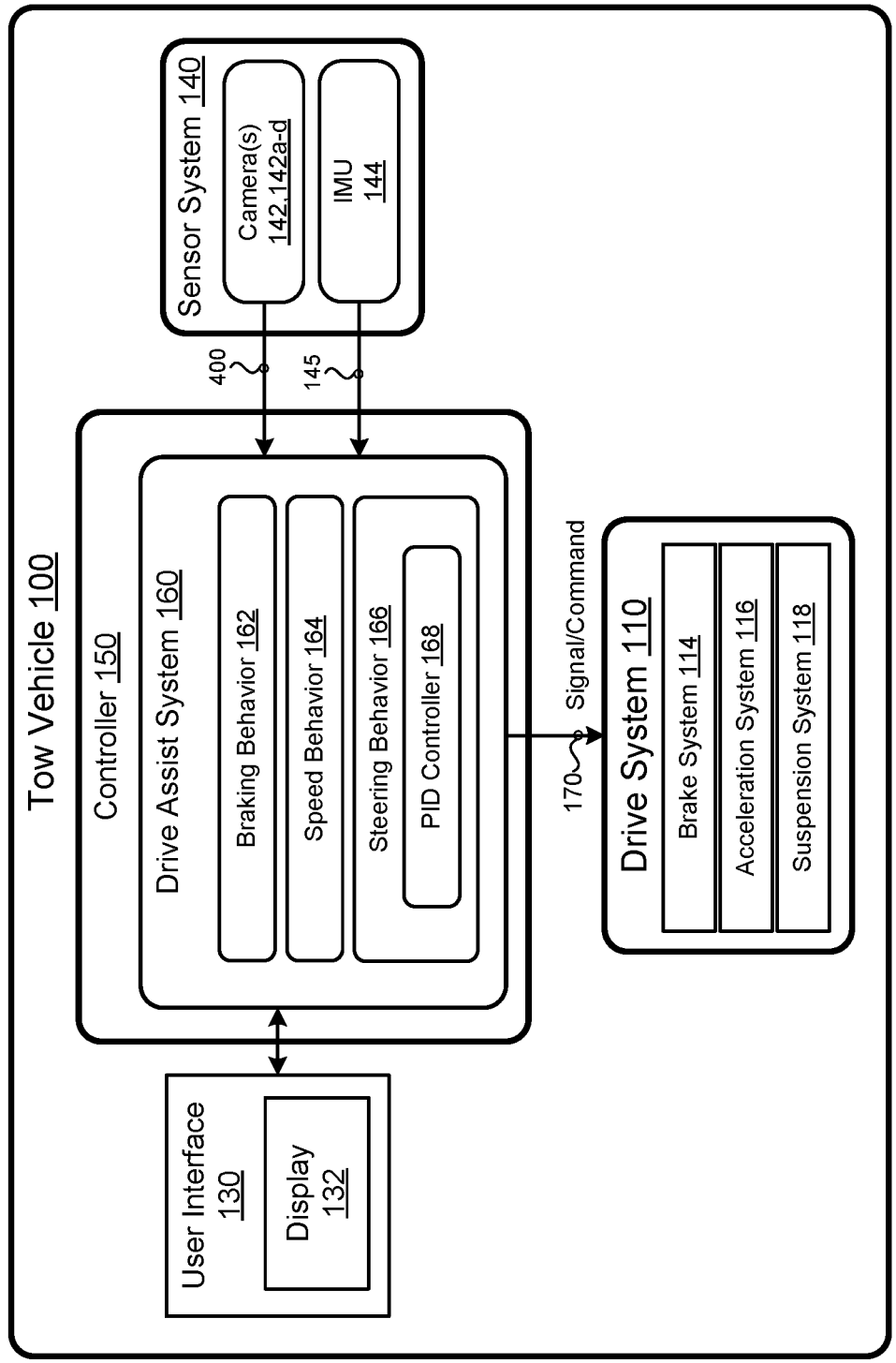
FIG. 2 is a schematic view of an exemplary tow vehicle having a user interface and a sensor system.

Referring to FIGS. 1 and 2, in some implementations, a driver of a tow vehicle 100 wants to tow a trailer 200 positioned behind the tow vehicle 100. The tow vehicle 100 may be configured to receive an indication of a trailer selection 134 by the driver associated with a selected trailer 200, 200a-c. In some examples, the driver maneuvers the tow vehicle 100 towards the selected trailer 200, 200a-c, while in other examples, the tow vehicle 100 autonomously drives towards the selected trailer 200, 200a-c. The tow vehicle 100 may include a drive system 110 that maneuvers the tow vehicle 100 across a road surface based on drive commands having x, y, and z components, for example. As shown, the drive system 110 includes a front right wheel 112, 112a, a front left wheel 112, 112b, a rear right wheel 112, 112c, and a rear left wheel 112, 112d. The drive system 110 may include other wheel configurations as well. The drive system 110 may also include a brake system 114 that includes brakes associated with each wheel 112, 112a-d, and an acceleration system 116 that is configured to adjust a speed and direction of the tow vehicle 100. In addition, the drive system 110 may include a suspension system 118 that includes tires associates with each wheel 112, 112a-d, tire air, springs, shock absorbers, and linkages that connect the tow vehicle 100 to its wheels 112, 112a-d and allows relative motion between the tow vehicle 100 and the wheels 112, 112a-d. The suspension system 118 may be configured to adjust a height of the tow vehicle 100 allowing a tow vehicle hitch 120 (e.g., a vehicle hitch ball 122) to align with a trailer hitch 210 (e.g., trailer hitch coupler or trailer hitch cup 212), which allows for autonomous connection between the tow vehicle 100 and the trailer 200.

The tow vehicle 100 may move across the road surface by various combinations of movements relative to three mutually perpendicular axes defined by the tow vehicle 100: a transverse axis X, a fore-aft axis Y, and a central vertical axis Z. The transverse axis x extends between a right side and a left side of the tow vehicle 100. A forward drive direction along the fore-aft axis Y is designated as F, also referred to as a forward motion. In addition, an aft or rearward drive direction along the fore-aft direction Y is designated as R, also referred to as rearward motion. When the suspension system 118 adjusts the suspension of the tow vehicle 100, the tow vehicle 100 may tilt about the X axis and or Y axis, or move along the central vertical axis Z.

The tow vehicle 100 may include a user interface 130, such as, a display 132. The user interface 130 receives one or more user commands from the driver via one or more input mechanisms or a touch screen display 132 and/or displays one or more notifications to the driver. The user interface 130 is in communication with a vehicle controller 150, which is in turn in communication with a sensor system 140. In some examples, the user interface 130 displays an image 400 of an environment of the tow vehicle 100 leading to one or more commands being received by the user interface 130 (from the driver) that initiate execution of one or more behaviors. In some examples, the user display 132 displays one or more trailer representations 136, 136a-c of trailers 200 positioned behind the tow vehicle 100. In this case, the driver makes a trailer selection 134 of a trailer representation 136, 136a-c of a trailer 200.

The tow vehicle 100 may include a sensor system 140 to provide reliable and robust driving. The sensor system 140 may include different types of sensors that may be used separately or with one another to create a perception of the environment of the tow vehicle 100 that is used for the tow vehicle 100 to drive and aid the driver in make intelligent decisions based on objects and obstacles detected by the sensor system 140. The sensor system 140 may include the one or more cameras 142, 142a-d. In some implementations, the tow vehicle 100 includes a rear camera 142, 142a that is mounted to provide a view of a rear-driving path of the tow vehicle 100. The rear camera 142a may include a fisheye lens that includes an ultra wide-angle lens that produces strong visual distortion intended to create a wide panoramic or hemispherical image. Fisheye cameras capture images having an extremely wide angle of view. Moreover, images 400 captured by the fisheye camera 142a have a characteristic convex non-rectilinear appearance.

Other types of cameras may also be used to capture images of the rear of the tow vehicle 100.

In some implementations, the sensor system 140 may also include an IMU (inertial measurement unit) 144 configured to output IMU data 145 that includes the vehicle's linear acceleration (using one or more accelerometers) and rotational rate (using one or more gyroscopes). In some examples, the IMU 144 also determines a heading reference of the tow vehicle 100. Therefore, the IMU 144 determines the pitch, roll, and yaw of the tow vehicle 100. The sensor system 140 may include other sensors such as, but not limited to, radar, sonar, LIDAR (Light Detection and Ranging, which can entail optical remote sensing that measures properties of scattered light to find range and/or other information of a distant target), LADAR (Laser Detection and Ranging), etc.

The vehicle controller 150 includes a computing device (or processor) 152 (e.g., central processing unit having one or more computing processors) in communication with non-transitory memory 154 (e.g., a hard disk, flash memory, random-access memory, memory hardware) capable of storing instructions executable on the computing processor(s) 152.

The vehicle controller 150 executes a drive assist system 160. The drive assist system 160 receives images 400 from the camera 142 and executes behaviors 162-166 that send commands 170 to the drive system 110, leading to the tow vehicle 100 autonomously driving toward to the selected trailer 200 in a rearward direction R.

The drive assist system 160 includes a braking behavior 162, a speed behavior 164, and a steering behavior 166. In some examples, the drive assist system 160 also includes a hitch connect behavior (allowing the vehicle hitch ball 122 to connect to the trailer hitch cup 212), and a suspension adjustment behavior (causing the vehicle suspension to adjust to allow for the hitching of the vehicle hitch ball 122 and the trailer hitch coupler 212). Each behavior 162-166 causes the tow vehicle 100 to take an action, such as driving backward, turning at a specific angle, breaking, speeding, slowing down, among others. The vehicle controller 150 may maneuver the tow vehicle 100 in any direction across the road surface by controlling the drive system 110, more specifically by issuing commands 170 to the drive system 110. In addition, the drive assist system 160 determines a steering wheel angle and a speed of the tow vehicle 100 based on the received images 400.

The braking behavior 162 may be executed to either stop the tow vehicle 100 or to slow down the tow vehicle 100 based on the determined steering wheel angle and the determined speed of the tow vehicle 100. The braking behavior 162 sends a signal or command 170 to the drive system 110, e.g., the brake system 114, to either stop the tow vehicle 100, reduce the speed of the tow vehicle 100, or stop applying the brakes.

The speed behavior 164 may be executed to change the speed of the tow vehicle 100 by either accelerating or decelerating based the determined steering wheel angle and the determined speed of the tow vehicle 100. The speed behavior 164 sends a signal or command 170 to the brake system 114 for decelerating or the acceleration system 116 for accelerating.

The steering behavior 166 may be executed to change the direction of the tow vehicle 100 based on the determined steering wheel angle and the determined speed of the tow vehicle 100. As such, the steering behavior 166 sends the acceleration system 116 a signal or command 170 indicative of an angle of steering causing the drive system 110 to change direction.

In some examples, the steering behavior 166 includes a proportional-integral-derivative controller 168 (PID controller). The PID controller 168 is a control loop feedback mechanism widely used in industrial control systems and a variety of other applications requiring continuously modulated control. The PID controller 168 continuously calculates an error value as the difference between a desired setpoint and a measured process variable and applies a correction based on proportional, integral, and derivative terms. The PID controller 168 determined the steering wheel angle based on the horizontal pixel distance D between the image center 402 and the target 416.

FIGS. 3 and 4A-4G illustrate a method 300 executed by the vehicle controller 150 for determining the position PT of the trailer 200 within images 400 and autonomously maneuvering the tow vehicle 100 towards the trailer 200. The method 300 is based on analyzing the received images 400 and determining the trailer position PT based on the analyzed images 400. In other words, the method 300 analyzes images 400 received from the rear camera 142a as the tow vehicle 100 is driving in a rearward direction R towards the trailer 200. The controller 150 analyzes the one or more images 400 and instructs the drive system 110 to maneuver the tow vehicle 100 such that, within each image 400, a pixel distance D between a center of a target 412 (i.e., a trailer representation 136 of the tow vehicle 100) and a vertical center 402 of the image 400 is minimized. During execution of the method 300 (by the controller 150), the tow vehicle 100 autonomously approaches the trailer 200 in a manner similar to a human driver driving, for example, by using single arc or bi-arc maneuvers. In some examples, each image 400, 400A-400G includes a representation of the rear portion of the tow vehicle 100 and a tow hitch ball representation 422 that may be bounded by a bounding box or circle 423.

At block 301, the drive assist system 160 receives one or more images 400 from the rear camera 142a. In some examples, at block 302, the drive assist system 160 determines a position of the trailer 200 within the image 400 by analyzing the one or more images 400. When the image 400 includes more than one trailer 200, the drive assist system 160 instructs the display 132 to solicit a trailer selection 134 associated with one of the trailers 200. In other examples, the driver selects the trailer 200 (i.e., a representation 136 of the trailer 200) from the image 400. Once the trailer representation 136 is selected or identified, in some examples, the drive assist system 160 bounds the identified trailer representation 136 by a bounding box also referred to as a region of interest (ROI) 410. The drive assist system 160 then determines a center line 412 of the ROI 410 extending vertically. The center line 412 is representative of a center line of the trailer representation 136 in the image 400. At block 302, the drive assist system 160 determines a vertical center line 402 of the image 400 and a horizontal center line 404 of the image 400. The vertical center line 402 and the horizontal center line 404 intersect at an image center C.

Figure 4A:
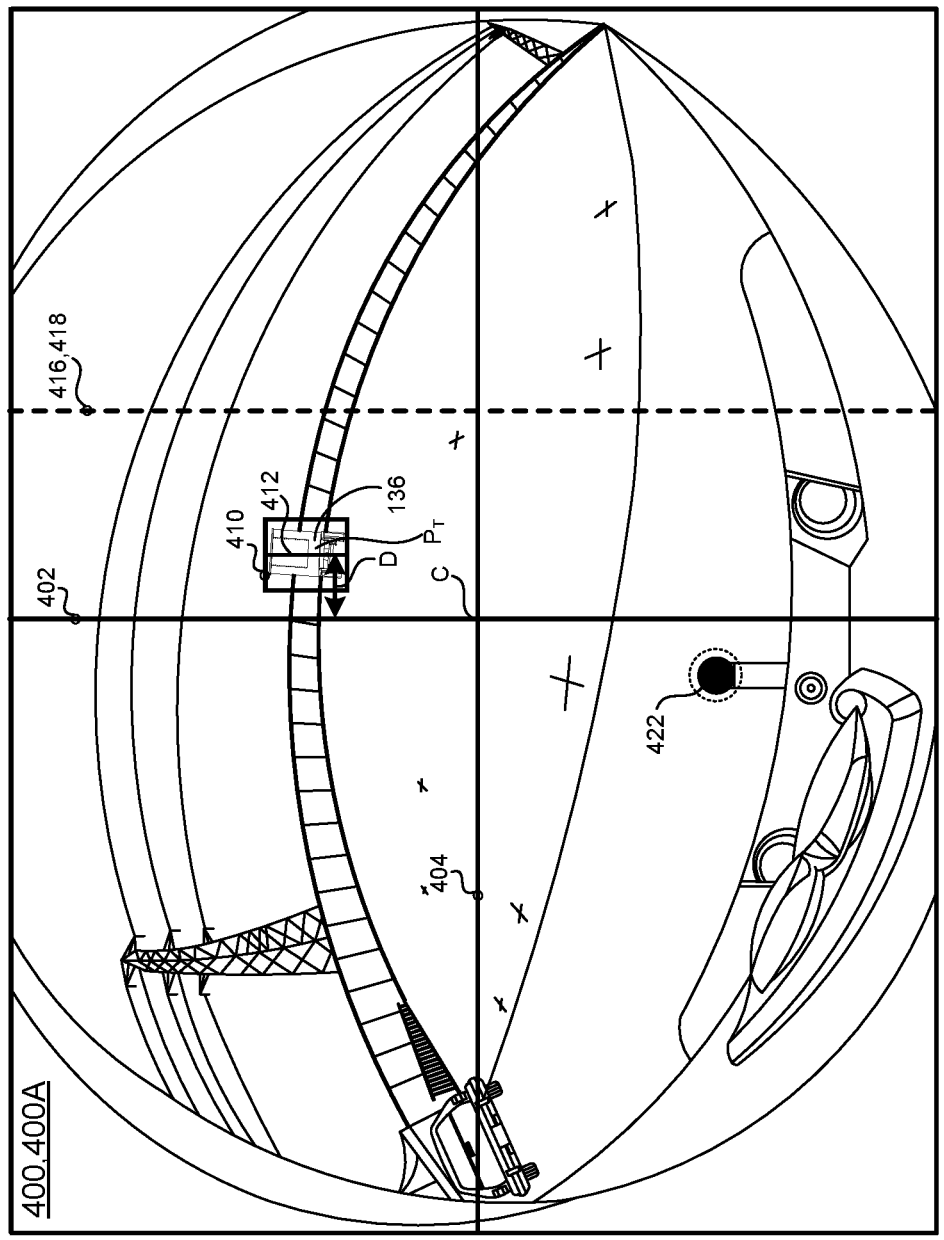
FIGS. 4A-4G are schematic views of images from a rear camera while executing the operations of FIG. 3.
Figure 4B:
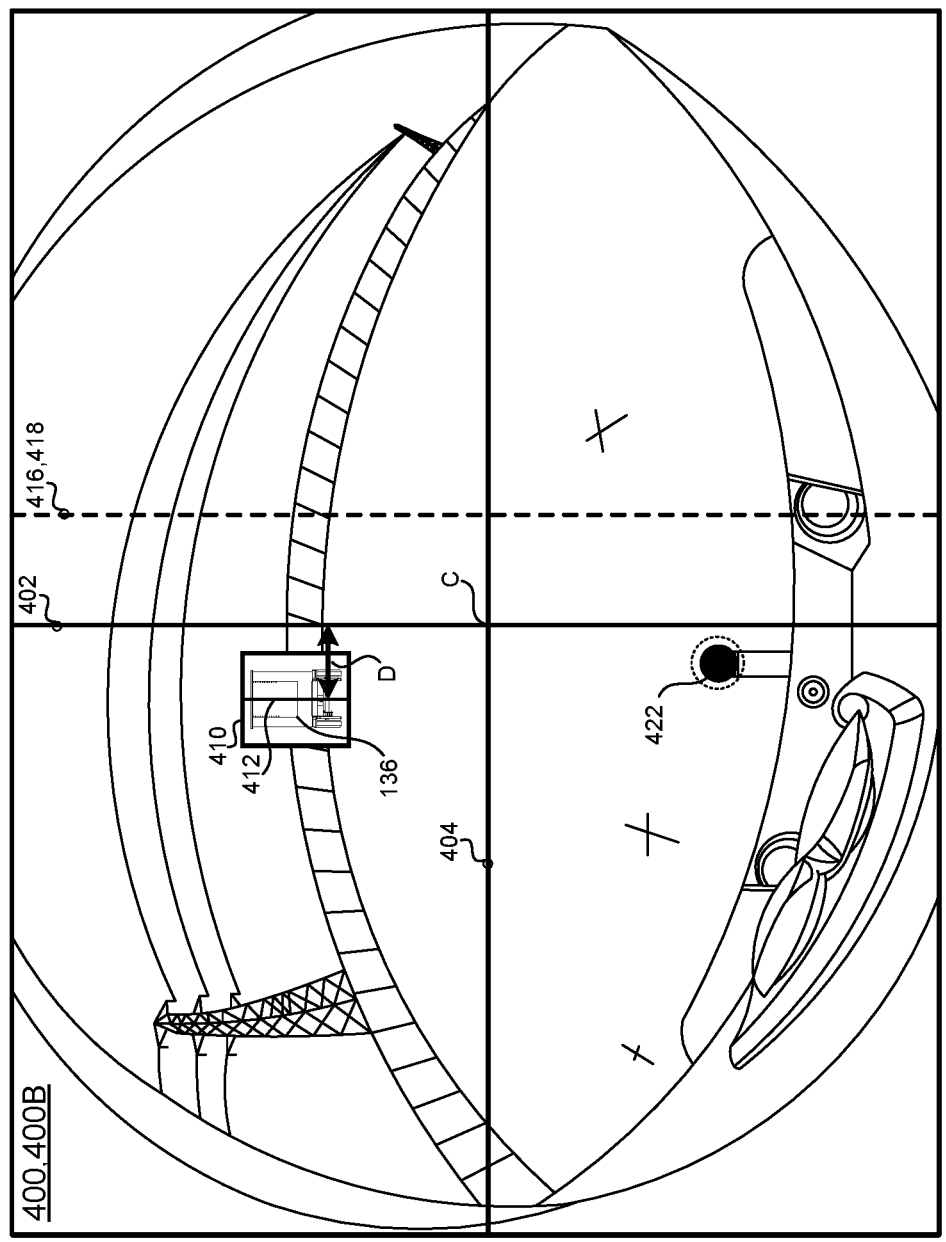
Figure 4C:
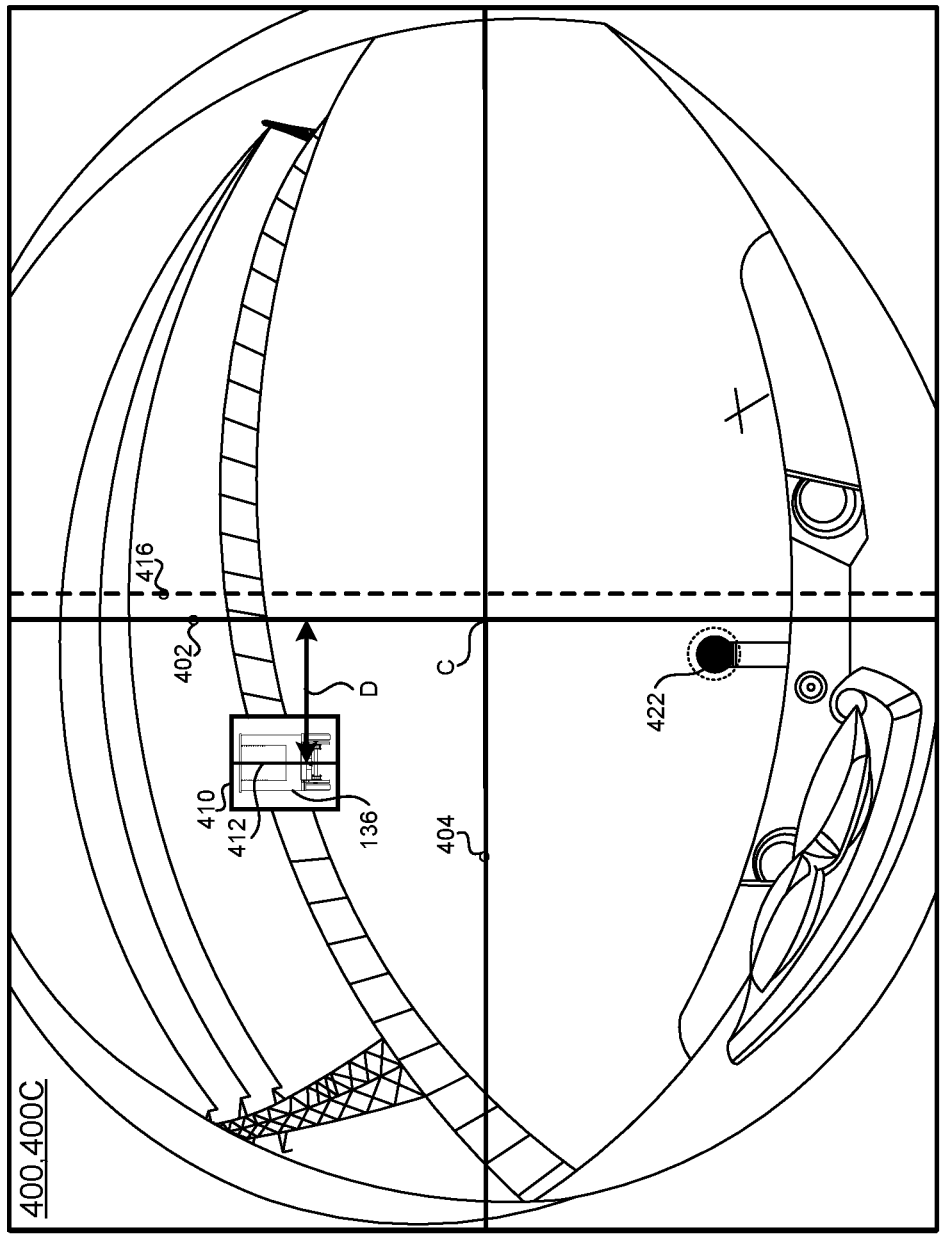
Figure 4D:
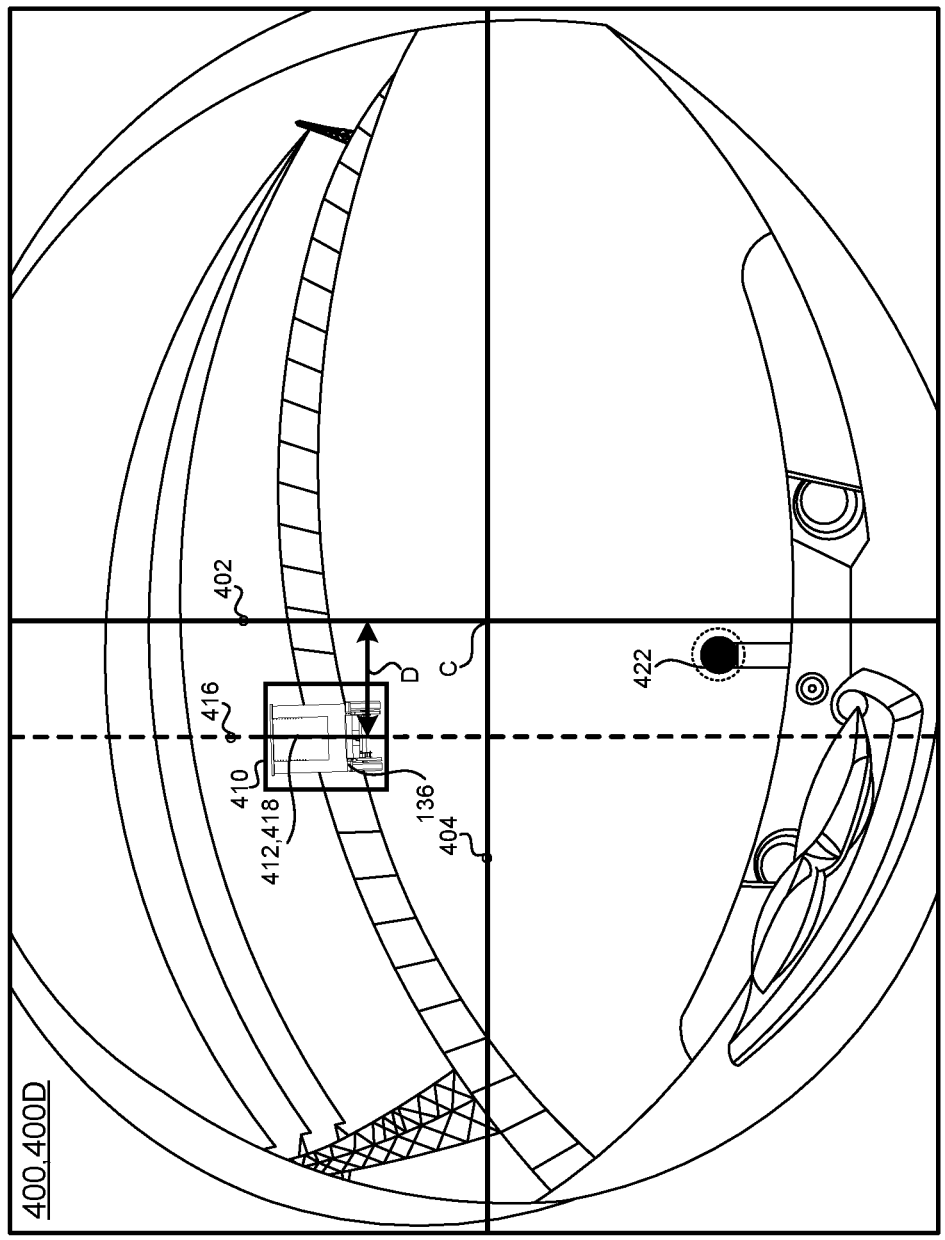
Figure 4E:
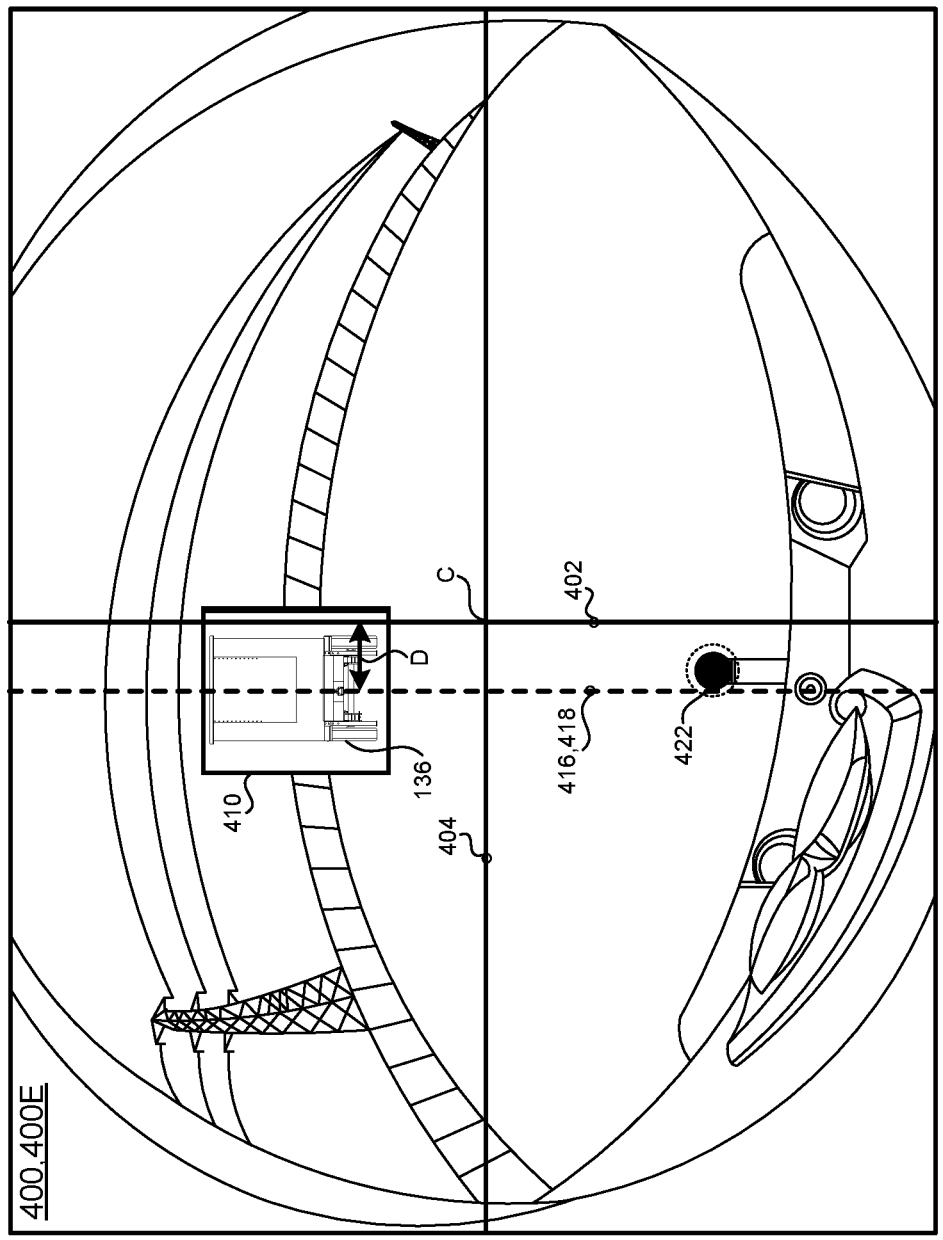
Figure 4F:
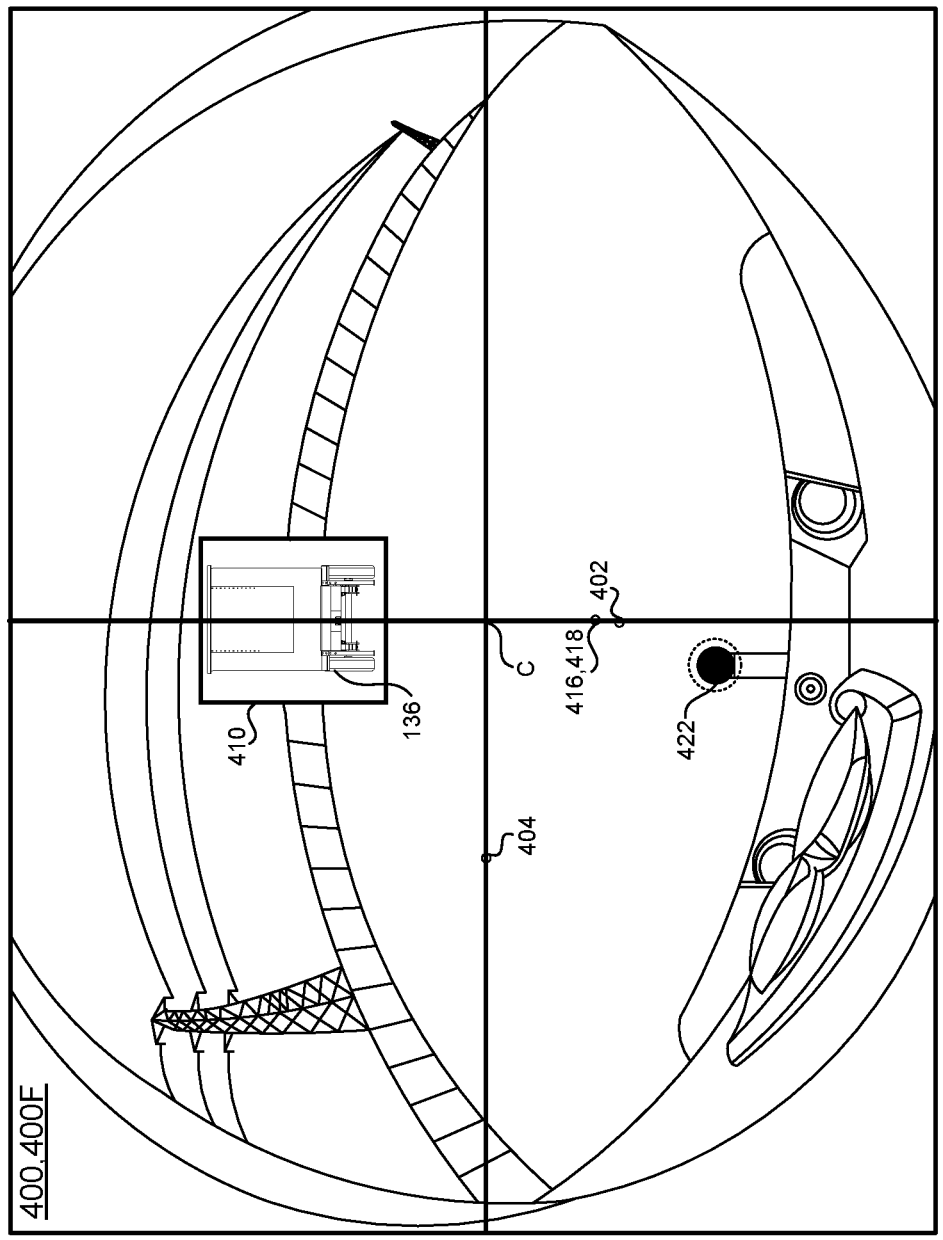
Figure 4G:
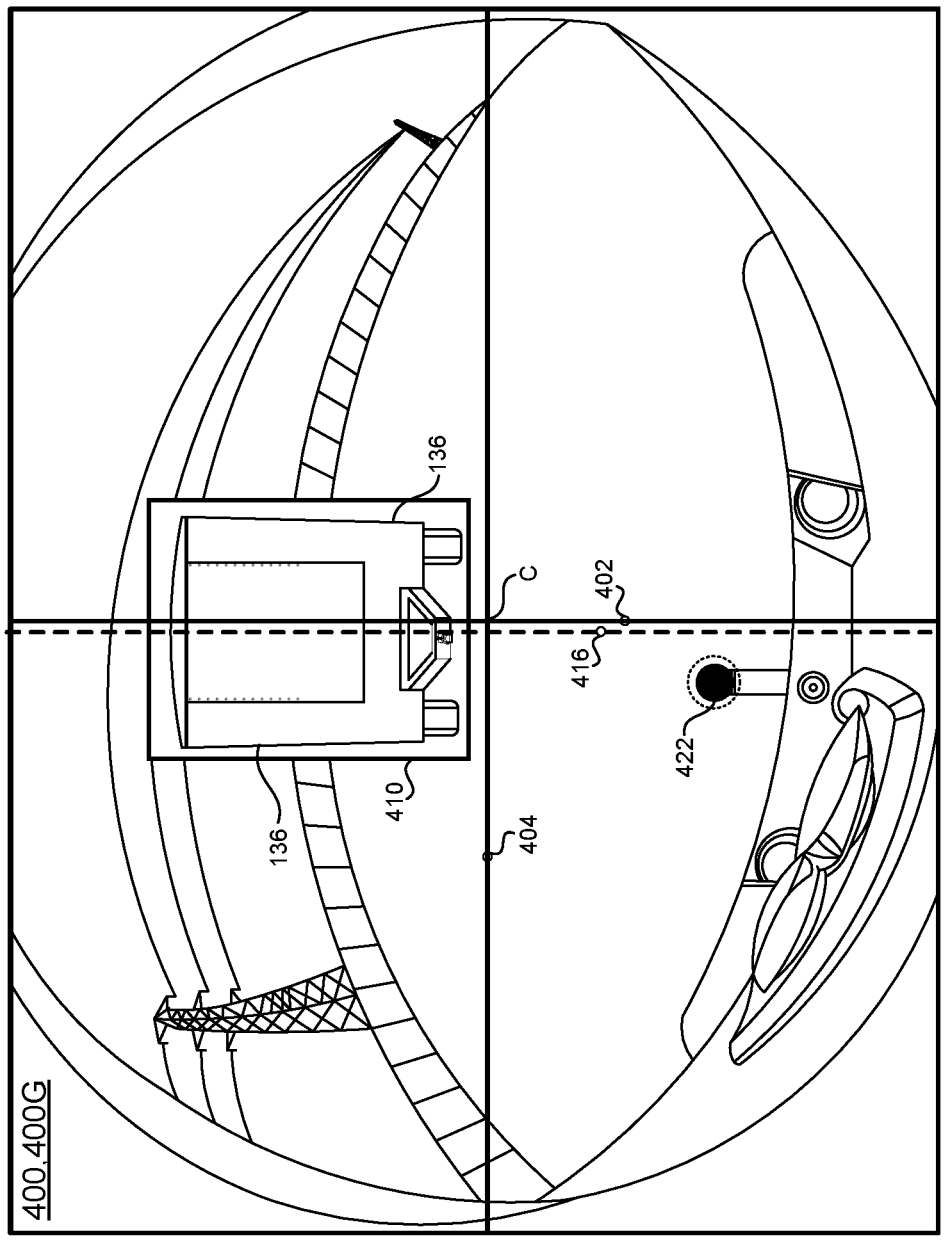
Figure 5:
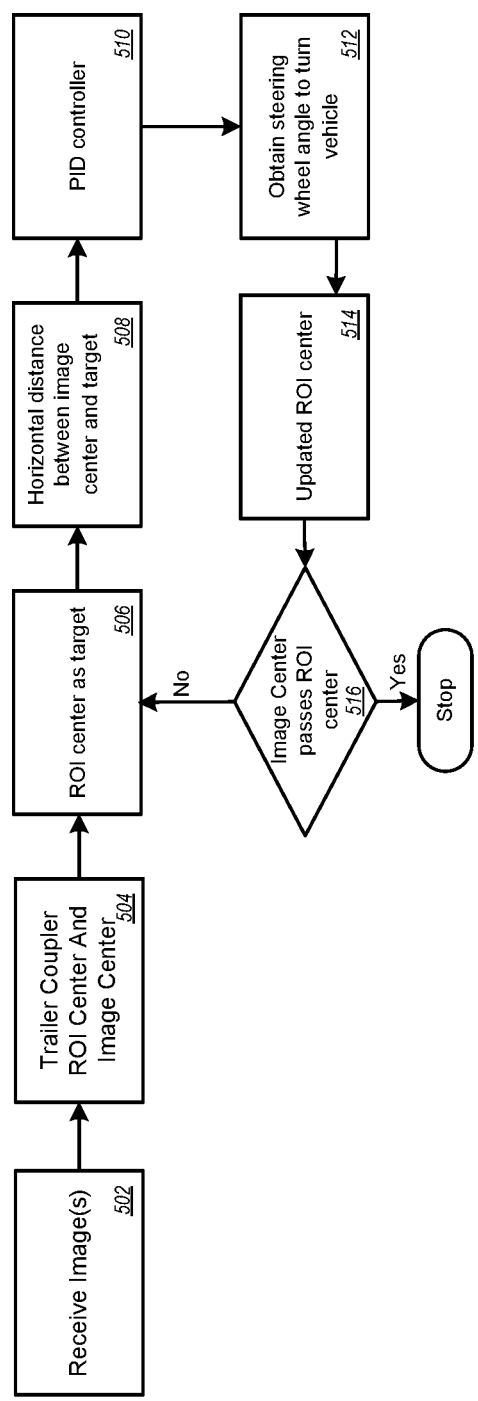
FIG. 5 is a schematic view of an exemplary arrangement of operations for autonomously maneuvering a vehicle hitch ball of the tow vehicle towards a trailer hitch coupler of a trailer positioned behind the tow vehicle.

At block 304, the drive assist system 160 determines the horizontal pixel distance D between the image vertical center 402 and the ROI vertical center 412 (i.e., the trailer bounding box center). At decision block 306, the drive assist system 160 determines whether the horizontal pixel distance D is less than a threshold being a number of pixels. In some examples, the threshold can be half the width of the ROI 410. If the drive assist system 160 determines that the horizontal distance D is less than the threshold, then at block 308, the drive assist system 160 sets the ROI center 412, i.e., the trailer vertical center 412, as a target 418, as shown in FIGS. 4D-4F. After the drive assist system 160 sets the target 418 as the vertical center 412 of the ROI 410 and the tow vehicle 100 starts to autonomously maneuver towards the target 412, then at block 310, the drive assist system 160 determines the distance D between the image vertical center 402 and the target 418, i.e., the vertical center 412. Following, at block 312, the PID controller 168 analyzes the horizontal distance D between the image center 402 and the target 418 and, at block 314, the PID controller 168 determines a steering wheel angle to turn and maneuver the tow vehicle 100 in real time towards the target center 412. At block 316, the drive assist system 160 updates the ROI center 412 after the drive assist system 160 issues commands 170 to the drive system 110 to maneuver the tow vehicle 100 based on the determined steering wheel angle. At decision block 318, the drive assist system 160 determines if the image vertical center 402 has passed the ROI vertical center 412. In other words, at decision block 318, the drive assist system 160 determines if the horizontal distance D is equal to or less than zero. If the drive assist system 160 determines that the image vertical center 402 has not passed the ROI vertical center 412, then the drive assist system 160 repeats the steps of blocks 308-318. The horizontal distance D being less than zero is indicative of the tow vehicle 100 moving away from the trailer 200 since a horizontal distance D equaling zero is indicative of the tow vehicle 100 and trailer 200 being aligned. If, at decision block 318, the drive assist system 160 determines that the image vertical center 402 has passed the ROI vertical center 412, then the drive assist system 160 stops its calculations because the tow vehicle 100 has reached a predetermined pixel distance from the horizontal center 404 of the image 400.

Referring back to decision block 306, if the drive assist system 160 determines that the horizontal pixel distance D is not less than the threshold, i.e., the pixel distance D is greater than the threshold, then the tow vehicle 100 follows a two-turn maneuver to autonomously drive towards the trailer 200. During the first turn, the tow vehicle 100 tracks the ROI center 412 with a predefined lateral offset 416 as shown in FIG. 4A. The tow vehicle 100 then autonomously turns with a maximum steering wheel angle as shown in FIG. 4B. Then during the second turn, the tow vehicle 100 tracks the ROI center 412 as shown in FIGS. 4C-4D. The tow vehicle 100 turns with the steering wheel angle that is relative to the horizontal pixel distance D between the image center 402 and the ROI center 412. The steer wheel angle is calculated by the PID controller 168 based on the horizontal pixel distance D. With continued reference to FIG. 3, at block 320, the drive assist system 160 uses the offset 416 from the ROI center 412 as the target (FIG. 4A). The offset 416 is a vertical line within the image 400 that is on the same side of the image as the trailer 200. As shown, the trailer 200 is on the right side of the image 400, therefore, the offset 416 is also on the right side of the image 400. At block 322, the drive assist system 160 determines a maximum steering wheel angle to turn the tow vehicle 100 toward to target 418, since it is established at decision block 306 that the horizontal distance D is greater than the threshold. Once the tow vehicle 100 has completed the maximum steering wheel angle, the captured image 400 shown in FIG. 4B includes the trailer 200 being at the opposite side of the image center 402 than its initial position. For example, in FIG. 4A the tow vehicle 100 and the offset 416 were on the same side of the image 400 with respect to the vertical center 402; while after the maneuver, the tow vehicle 100 is on the left side and the offset 416 remains on the right side. At block 324, the drive assist system 160, updates the target 418 within the image 400 due to the movement of the tow vehicle 100 in block 322. Then, at decision block 326, the drive assist system 160 determines if the image center 402 has passed the target 418 while the tow vehicle 100 is autonomously moving in the rearward direction R. In other words, at decision block 326, the drive assist system 160 determines if the horizontal distance D is equal to or less than zero. If the drive assist system 160 determines that the image center 414 has not passed the target 418, then the drive assist system 160 repeats the steps of blocks 322, 324, and 326. However, if the drive assist system 160 determines that the image center 414 has passed the target 418 as shown in FIG. 4D, then the drive assist system 160 sets the ROI center 412 as a new target 418 at block 308.

Figure 3:
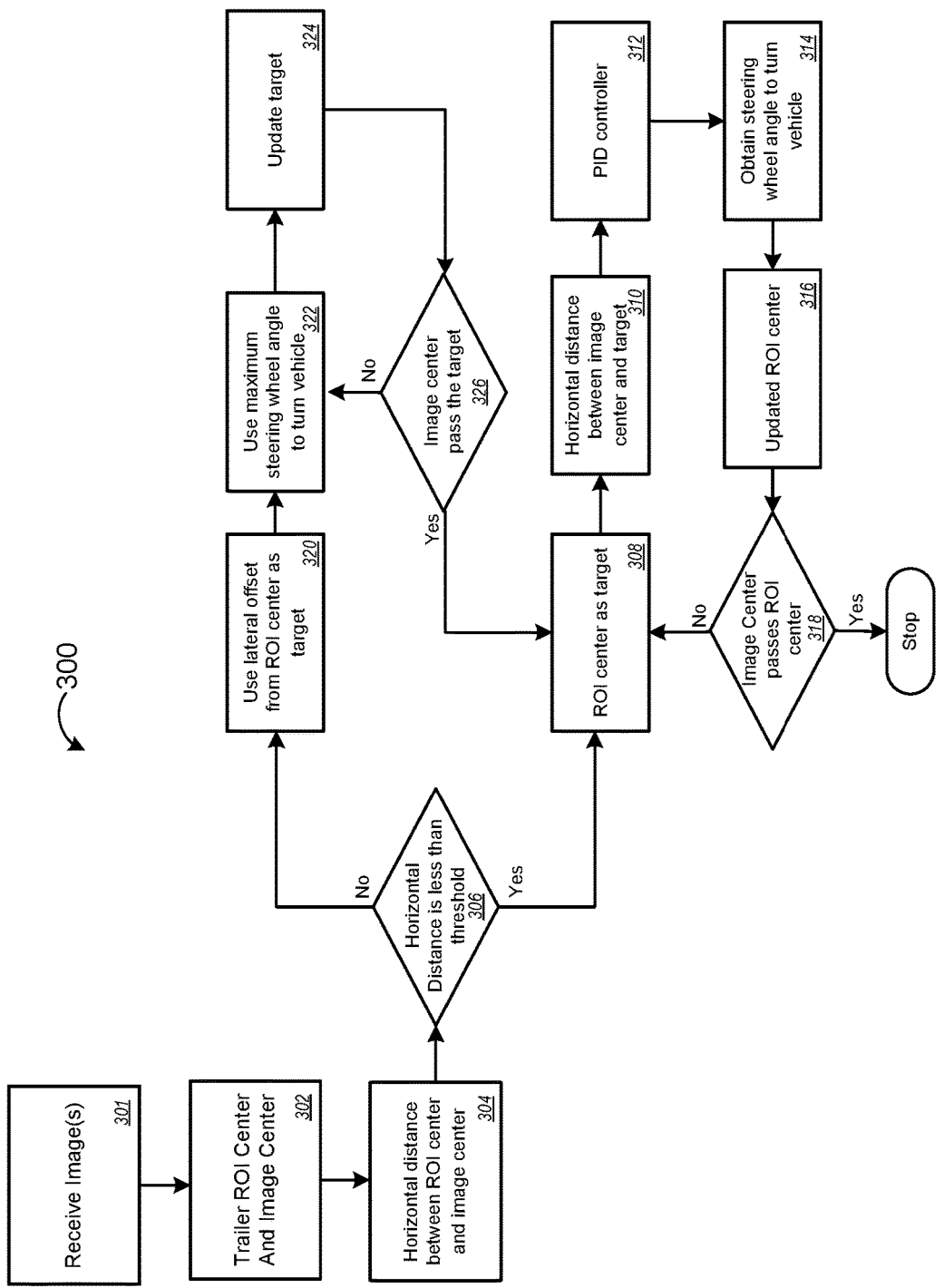
FIG. 3 is a schematic view of an exemplary arrangement of operations for autonomously maneuvering a tow vehicle towards a trailer positioned behind the tow vehicle.

Referring to FIGS. 5 and 6A-6C, in some implementations, the controller 150 executes a method similar to the method 300 described with respect to FIG. 3 to identify the trailer hitch cup 212 of the trailer 200 and autonomously drive to and connect the vehicle hitch ball 122 to the trailer hitch cup 212.

In some implementations, at block 502, the drive assist system 160 receives one or more images 400 from the rear camera 142a. The drive assist system 160 determines a position of the trailer hitch coupler 212 within the image 400 by analyzing the one or more images 400. In some examples, the drive assist system 160 instructs the display 132 to solicit from the driver a coupler representation selection within the image 400 associated with the trailer 200. The driver selects the trailer coupler 212 (i.e., a representation 136 of the trailer hitch coupler 212) from the image 400. Once the coupler representation 424 is identified, in some examples, the drive assist system 160 bounds the identified coupler representation 424 by a bounding box or circle (as shown) also referred to as the region of interest (ROI) 410. At block 504, the drive assist system 160 then determines a center line 412 of the ROI 410 extending vertically. The center line 412 representative of a center line of the coupler representation 424 in the image 400. Also at block 504, the drive assist system 160 determines a vertical center 402 of the image 400.

Figure 6A:
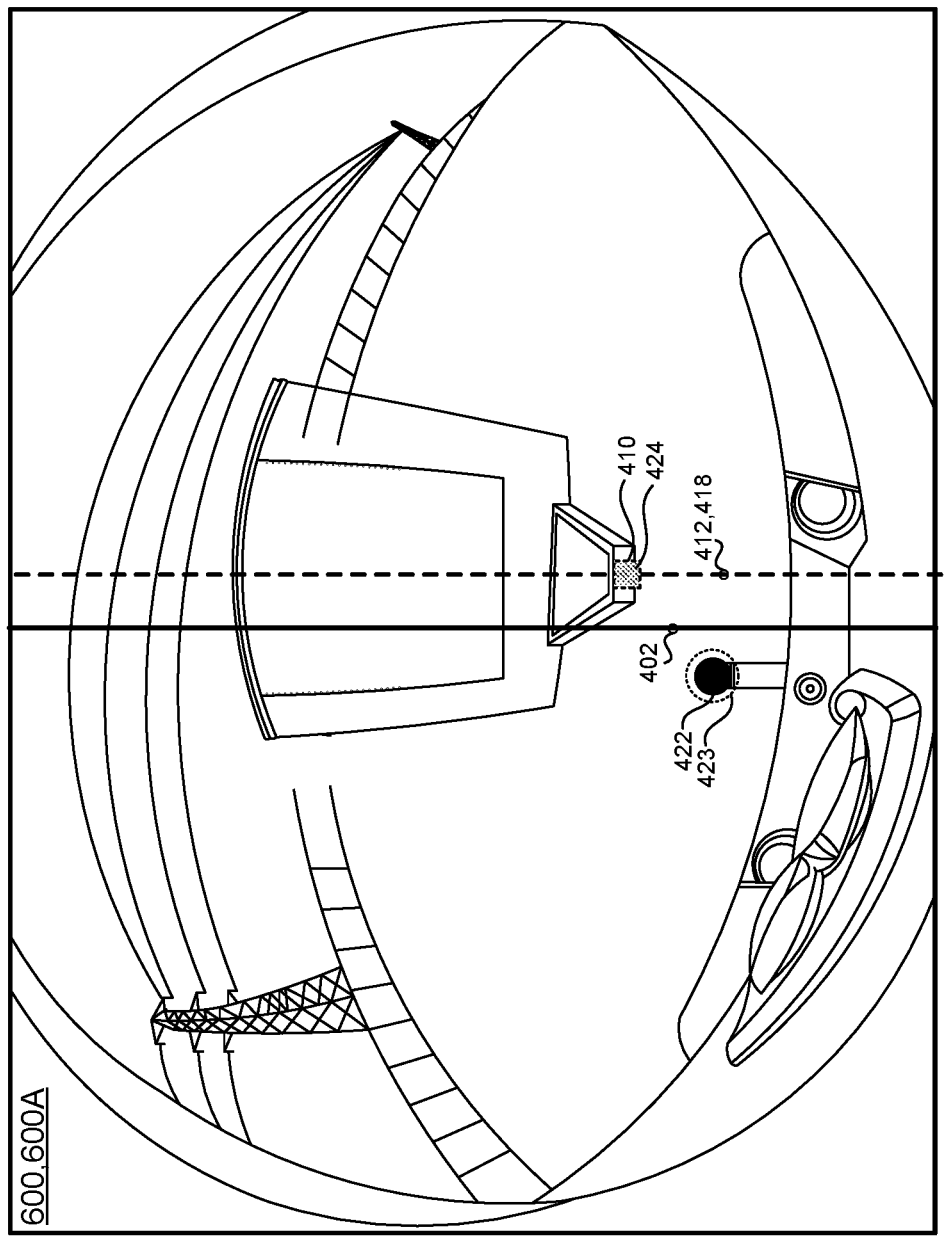
FIGS. 6A-6C are schematic views of images from a rear camera while executing the operations of FIG. 5.
Figure 6B:
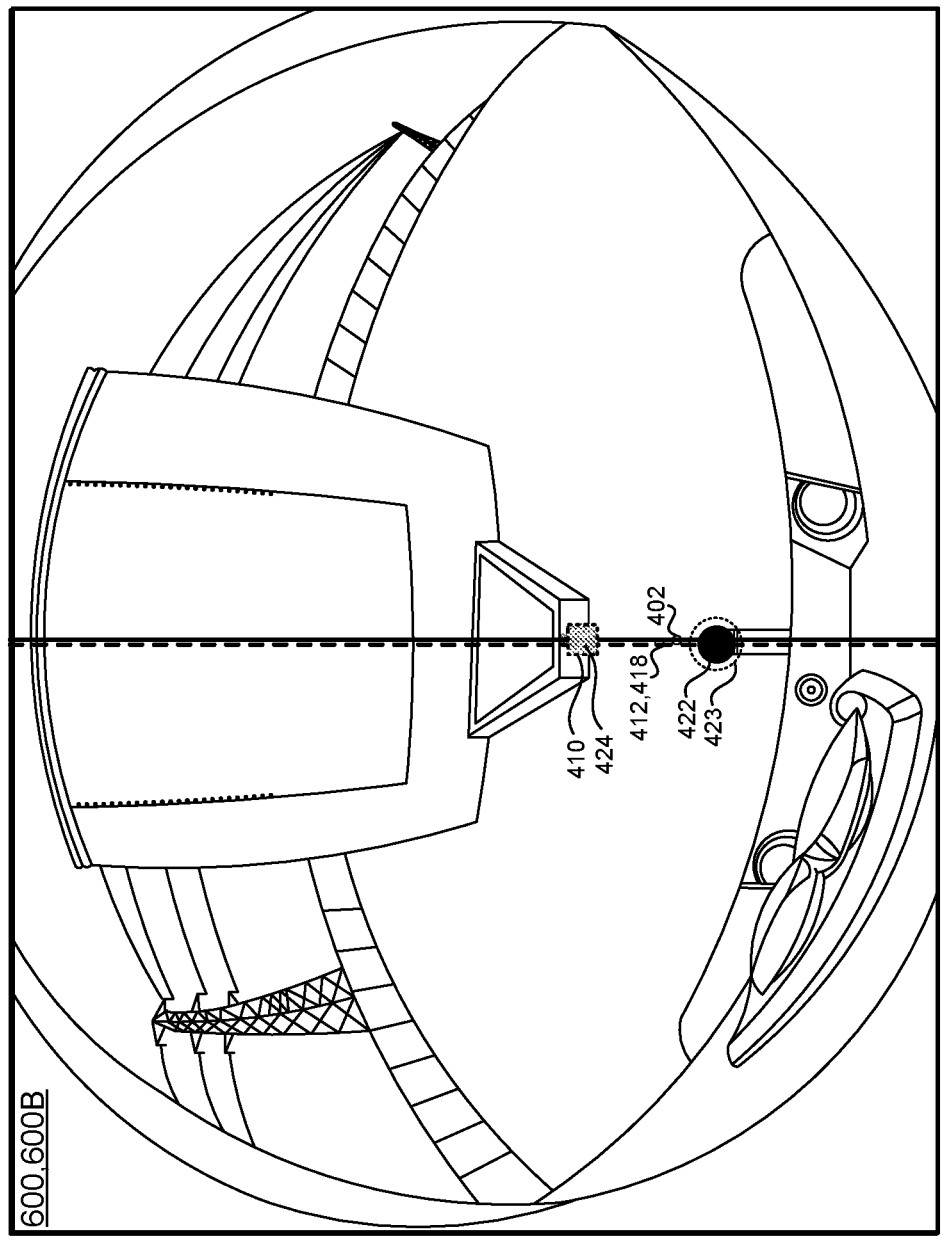
Figure 6C:
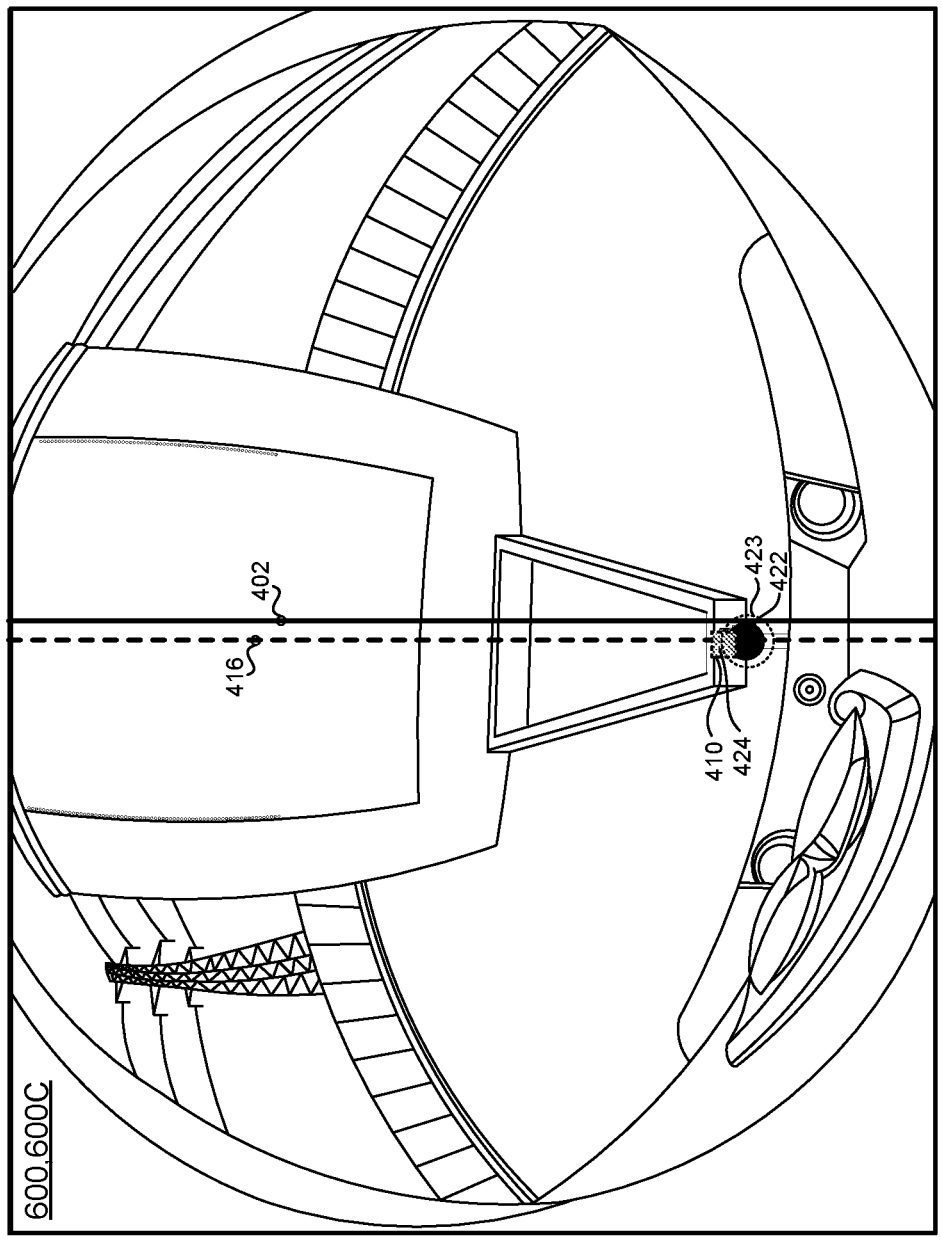

At block 506, the drive assist system 160 sets the ROI center 412, i.e., the coupler vertical center 412, as a target 418, as shown in the rearward images 600A-600C of FIGS. 6A-6C respectively. After the drive assist system 160 sets the target 418 as the vertical center 412 of the ROI 410 and the tow vehicle 100 starts to autonomously maneuver towards the target 412, then at block 508, the drive assist system 160 determines the distance D between the image vertical center 402 and the target 418, i.e., the vertical center 412. Following, at block 510, the PID controller 168 analyzes the horizontal distance D between the image center 402 and the target 418 and, at block 512, the PID controller 168 determines a steering wheel angle to turn and maneuver the tow vehicle 100 in real time towards the target center 412. At block 514, the drive assist system 160 updates the ROI center 412 after the drive assist system 160 issues commands 170 to the drive system 110 to maneuver the tow vehicle 100 based on the determined steering wheel angle. At decision block 516, the drive assist system 160 determines if the image vertical center 402 has passed the ROI vertical center 412. In other words, at decision block 516, the drive assist system 160 determines if the horizontal distance D is equal to or less than zero. If the drive assist system 160 determines that the image vertical center 402 has not passed the ROI vertical center 412, then the drive assist system 160 repeats the steps of blocks 506-516. The horizontal distance D being less than zero is indicative of the tow vehicle 100 moving away from the trailer 200 since a horizontal distance D equaling zero is indicative of the tow vehicle 100 and trailer 200 being aligned. If, at decision block 318, the drive assist system 160 determines that the image vertical center 402 has passed the ROI vertical center 412, then the drive assist system 160 stops its calculations because the tow hitch ball 122 is aligned with the trailer hitch coupler 212.

As previously discussed, the drive assist system 160 requires low computational resources and can achieve real time performance on low cost hardware. Since no marker is needed on the trailer, the complexity of the operation and computations is reduced and thus the production cost of the system is also reduced.

Figure 7:
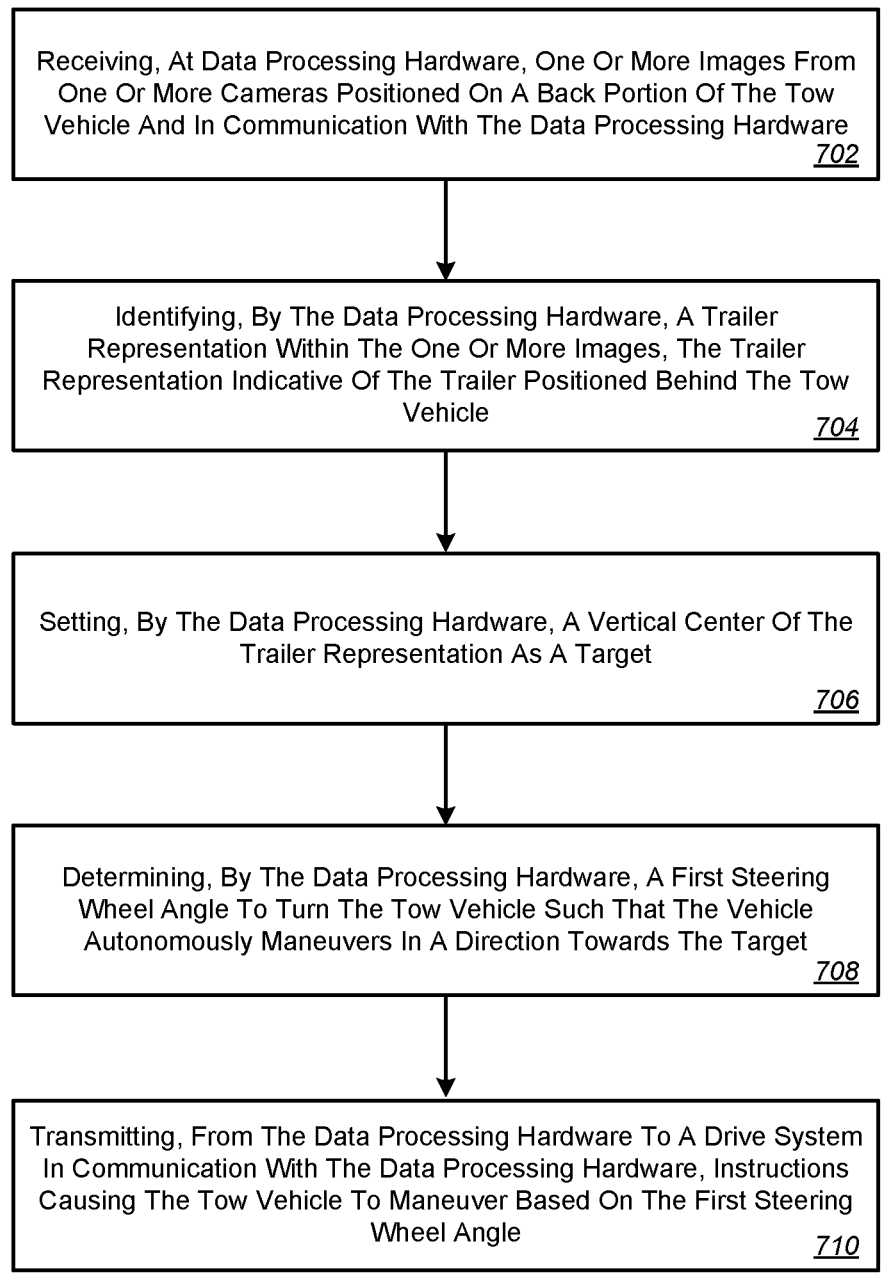
FIG. 7 is a schematic view of an exemplary arrangement of operations for autonomously maneuvering a tow vehicle towards a target.

FIG. 7 provides an example arrangement of operations of a method 700 of for autonomously maneuvering a tow vehicle 100 towards a trailer 200 positioned behind the tow vehicle 100 using the system described in FIGS. 1-6C. At block 702, the method 700 includes receiving, at data processing hardware 152 (of a controller 150), one or more images 400 from one or more cameras 142, 142a-d positioned on a back portion of the tow vehicle 100 and in communication with the data processing hardware 152.

At block 704, the method 700 includes identifying, by the data processing hardware 152, a trailer representation 136 within the one or more images 400, the trailer representation 136 indicative of the trailer 200 positioned behind the tow vehicle 100.

At block 706, the method 700 includes setting, by the data processing hardware 152, a vertical center 412 of the trailer representation 136 as a target 418.

At block 708, the method 700 includes determining, by the data processing hardware 152, a first steering wheel angle to turn the tow vehicle 100 such that the tow vehicle 100 autonomously maneuvers in a direction towards the target 418 (i.e., vertical center 412).

At block 710, the method 700 includes transmitting, from the data processing hardware 152 to a drive system 110 in communication with the data processing hardware 152, instructions 170 causing the tow vehicle 100 to maneuver based on the first steering wheel angle.

In some examples, the method 700 includes determining, by the data processing hardware 152, a pixel distance D between the vertical center 412 of the trailer representation 136 and a vertical center 402 of the one or more images 400. When the pixel distance D between the vertical center 412 of the trailer representation 136 and the vertical center 402 of the one or more images 400 is less than a threshold, the method includes: setting, by the data processing hardware 152, the vertical center 412 of the trailer representation 136 as the target 418; and determining, by the data processing hardware 152, the first steering wheel angle to turn the tow vehicle 100 such that the vehicle autonomously maneuvers in the direction towards the target 418 (i.e., the vertical center 412 of the trailer representation 136).

In some implementations, the method 700 includes determining, by the data processing hardware 152, a pixel distance D between the vertical center 412 of the trailer representation 136 and the vertical center 402 of the one or more images 400. When the pixel distance D between the vertical center 412 of the trailer representation 136 and the vertical center of the one or more images 400 is greater than a threshold, then method 700 includes setting, by the data processing hardware 152, a predefined lateral offset 416 from the vertical center 402 of the image 400 as the target 418; and determining, by the data processing hardware 152, a second steering wheel angle to turn the tow vehicle 100 such that the vehicle autonomously maneuvers in a direction towards the target 418. In some examples, the threshold includes a number of pixels. The second steering wheel angle to turn the tow vehicle 100 such that the vehicle autonomously maneuvers in the direction towards the target 418 is a maximum steering wheel angle that prevents the tow vehicle 100 and the trailer 200 from jackknifing.

In some implementations, the method 700 further comprises bounding the trailer representation 136 with a bounding box 410. The vertical center 412 of the trailer representation 136 includes a line dividing the trailer representation 136 vertically into two equal sections. In some examples, the vertical center 402 of the one or more images 400 includes a line dividing each image 400 of the one or more images 400 vertically into two equal sections, where each section has equal number of pixels. The one or more cameras may be a monocular camera and/or a fisheye camera.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method for autonomously maneuvering a tow vehicle towards a trailer positioned behind the tow vehicle, the method comprising:
   receiving, at data processing hardware, one or more images from one or more cameras positioned on a back portion of the tow vehicle and in communication with the data processing hardware;
   identifying, by the data processing hardware, a trailer representation within the one or more images, the trailer representation indicative of the trailer positioned behind the tow vehicle;
   setting, by the data processing hardware, a vertical center of the trailer representation as a target, the vertical center defined by a vertical center line passing through the vertical center of the trailer representation; and dividing the trailer representation vertically into two equal sections;
   determining, by the data processing hardware and based upon the vertical center line of the trailer representation, a first steering wheel angle to turn the tow vehicle such that the vehicle autonomously maneuvers in a direction towards the target; and
   transmitting, from the data processing hardware to a drive system in communication with the data processing hardware, instructions causing the tow vehicle to maneuver based on the first steering wheel angle;
   wherein the method further comprises, for each image of the one or more images:
      determining, by the data processing hardware, a pixel distance between the vertical center line of the trailer representation and a vertical center line of the image corresponding to a vertical center of the image;
      when the pixel distance between the vertical centerline of the trailer representation and the vertical center line of the image is less than a threshold:
         setting, by the data processing hardware, the vertical center line of the trailer representation as the target; and
         determining, by the data processing hardware, the first steeling wheel angle to turn the tow vehicle such that the vehicle autonomously maneuvers in the direction towards the target.

2. The method of claim 1, further comprising:
   when the pixel distance between the vertical center line of the trailer representation and the vertical center line of the image is greater than threshold:
      setting, by the data processing hardware, a predefined lateral offset from the vertical center line of the image as the target; and
      determining, by the data processing hardware, a second steering wheel angle to turn the tow vehicle such that the vehicle autonomously maneuvers in a direction towards the target.

3. The method of claim 2, wherein the threshold includes a number of pixels.

4. The method of claim 2, wherein the second steering wheel angle to turn the tow vehicle such that the vehicle autonomously maneuvers in the direction towards the target is a maximum steering wheel angle that prevents the tow vehicle and the trailer from jackknifing.

5. The method of claim 1, further comprising bounding the trailer representation with a bounding box, wherein the vertical center of the trailer representation includes the vertical center line dividing the bounding box vertically into two equal sections.

6. The method of claim 1, wherein the vertical center line of the one or more images a each image of the one or more images vertically divides into two equal sections, each section having equal number of pixels.

7. The method of claim 1, wherein the one or more cameras include a monocular camera.

8. The method of claim 1, where in the one or more cameras include a fisheye camera.

9. The method of claim 1, wherein the vertical center line of the image and the vertical center line of the trailer representation are parallel to each other.

10. A system for autonomously maneuvering a tow vehicle towards a trailer positioned behind the tow vehicle, the system comprising:
    data processing hardware; and
    memory hardware in communication with the data processing hardware, the memory hardware storing instructions that when executed on the data processing hardware cause the data processing hardware to perform operations comprising:
        receiving one or more images from one or more cameras positioned on a back portion of the tow vehicle and in communication with the data processing hardware;
        identifying a trailer representation within the one or more images, the trailer representation indicative of the trailer positioned behind the tow vehicle;
        setting a vertical center of the trailer representation as a target, the vertical center defined by a vertical center line passing through the trailer representation and dividing the trailer representation vertically into two equal sections; determining, based upon the vertical center of the trailer representation, a first steering wheel angle to turn the tow vehicle such that the vehicle autonomously maneuvers in a direction towards the target; and
    transmitting to a drive system in communication with the data processing hardware, instructions causing the tow vehicle to maneuver based on the first steering wheel angle;
    wherein the operations further comprise, for each image of the one or more images:
        determining a pixel distance between the vertical center line of the trailer representation and a vertical center line of the image corresponding to a vertical center of the image which divides each image of the one or more images vertically into two equal sections, each section having equal number of pixels;
        when the pixel distance between the vertical centerline of the trailer representation and the vertical center line of the image is less than a threshold:
            setting, by the data processing hardware, the vertical center line of the trailer representation as the target; and
            determining, by the data processing hardware, the first steering wheel angle to turn the tow vehicle such that the vehicle autonomously maneuvers in the direction towards the target.

11. The system of claim 10, wherein the operations further comprise:
    when the pixel distance between the vertical center line of the trailer representation and the vertical center line of the image is greater than the threshold:
        setting, by the data processing hardware, a predefined lateral offset from the vertical center of the image as the target; and
        determining, by the data processing hardware, a second steering wheel angle to turn the tow vehicle such that the vehicle autonomously maneuvers in a direction towards the target.

12. The system of claim 11, wherein the threshold includes a number of pixels.

13. The system of claim 11, wherein the second steering wheel angle to turn the tow vehicle such that the vehicle autonomously maneuvers in the direction towards the target is a maximum steering wheel angle that prevents the tow vehicle and the trailer from jackknifing.

14. The system of claim 10, further comprising bounding the trailer representation with a bounding box, wherein the vertical center of the trailer representation includes the vertical center line dividing the trailer representation vertically into two equal sections.

15. The system of claim 10, wherein the vertical center of the one or more images includes a line dividing each image of the one or more images vertically into two equal sections, each section having equal number of pixels.

16. The system of claim 10, wherein the one or more cameras include a monocular camera.

17. The system of claim 10, where in the one or more cameras include a fisheye camera.

18. The system of claim 10, wherein the vertical center line of the image and the vertical center line of the trailer representation are parallel to each other.

19. A method for autonomously maneuvering a tow vehicle towards a trailer positioned behind the tow vehicle, the method comprising:
    receiving, at data processing hardware, one or more images from one or more cameras positioned on a back portion of the tow vehicle and in communication with the data processing hardware;
    identifying, by the data processing hardware, a trailer representation within the one or more images, the trailer representation indicative of the trailer positioned behind the tow vehicle;
    setting, by the data processing hardware, a vertical center of the trailer representation as a target, the vertical center defined by a vertical center line passing through the vertical center of the trailer representation; and dividing the trailer representation vertically into two equal sections;
    determining, by the data processing hardware and based upon the vertical center line of the trailer representation, a first steering wheel angle to turn the tow vehicle such that the vehicle autonomously maneuvers in a direction towards the target; and
    transmitting, from the data processing hardware to a drive system in communication with the data processing hardware, instructions causing the tow vehicle to maneuver based on the first steering wheel angle;
    wherein the method further comprises, for each image of the one or more images:
        determining, by the data processing hardware, a pixel distance between the vertical center line of the trailer representation and a vertical center line of the image corresponding to a vertical center of the image;
        when the pixel distance between the vertical center line of the trailer representation and the vertical center line of the image is greater than a threshold:
            setting, by the data processing hardware, a predefined lateral offset from the vertical center line of the image as the target; and
            determining, by the data processing hardware, a second steering wheel angle to turn the tow vehicle such that the vehicle autonomously maneuvers in a direction towards the target.

20. The method of claim 19, wherein the vertical center line of the image and the vertical center line of the trailer representation are parallel to each other.

\* \* \* \* \*